United States Patent Office 3,162,186
Patented Dec. 22, 1964

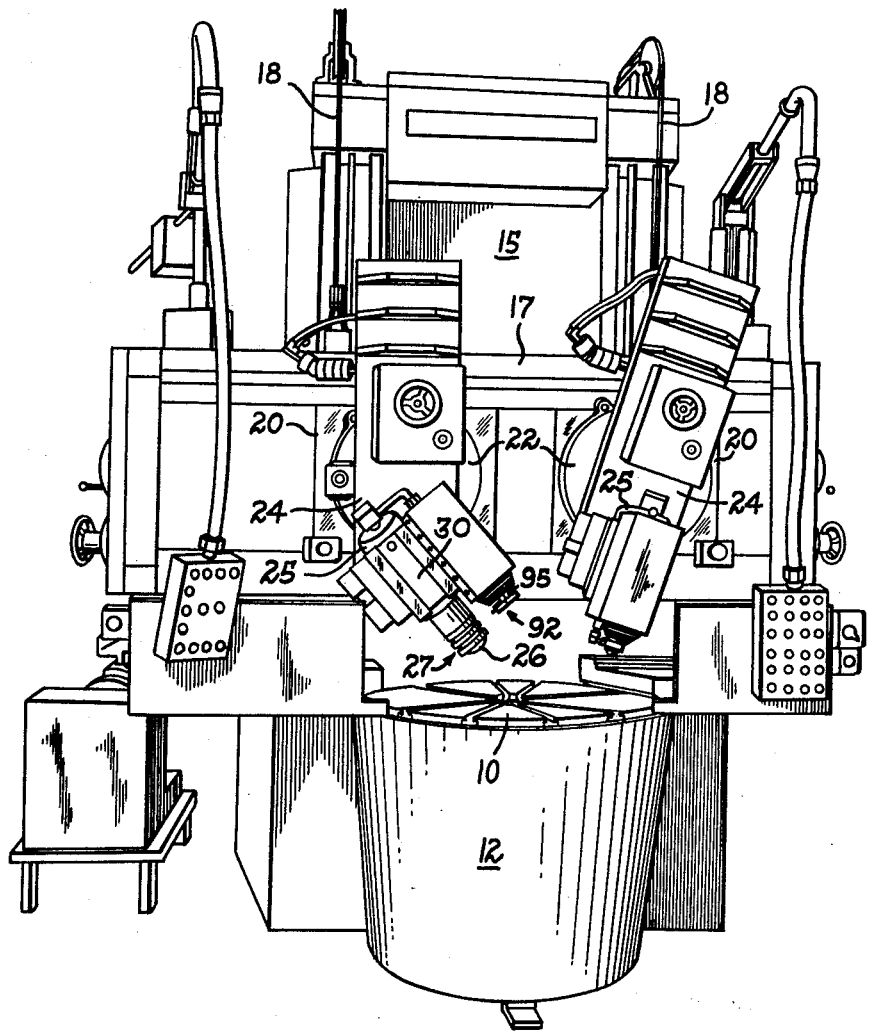

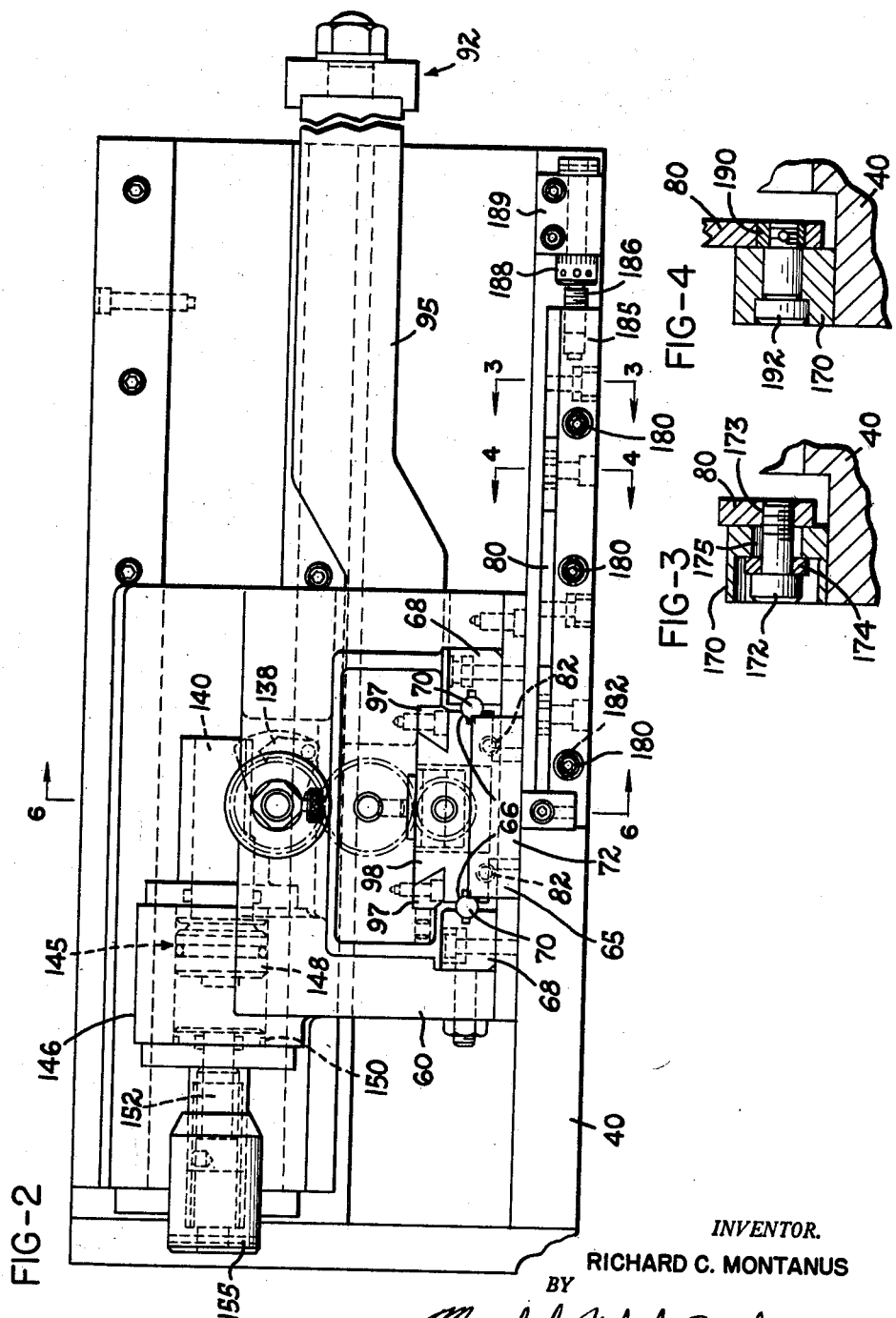

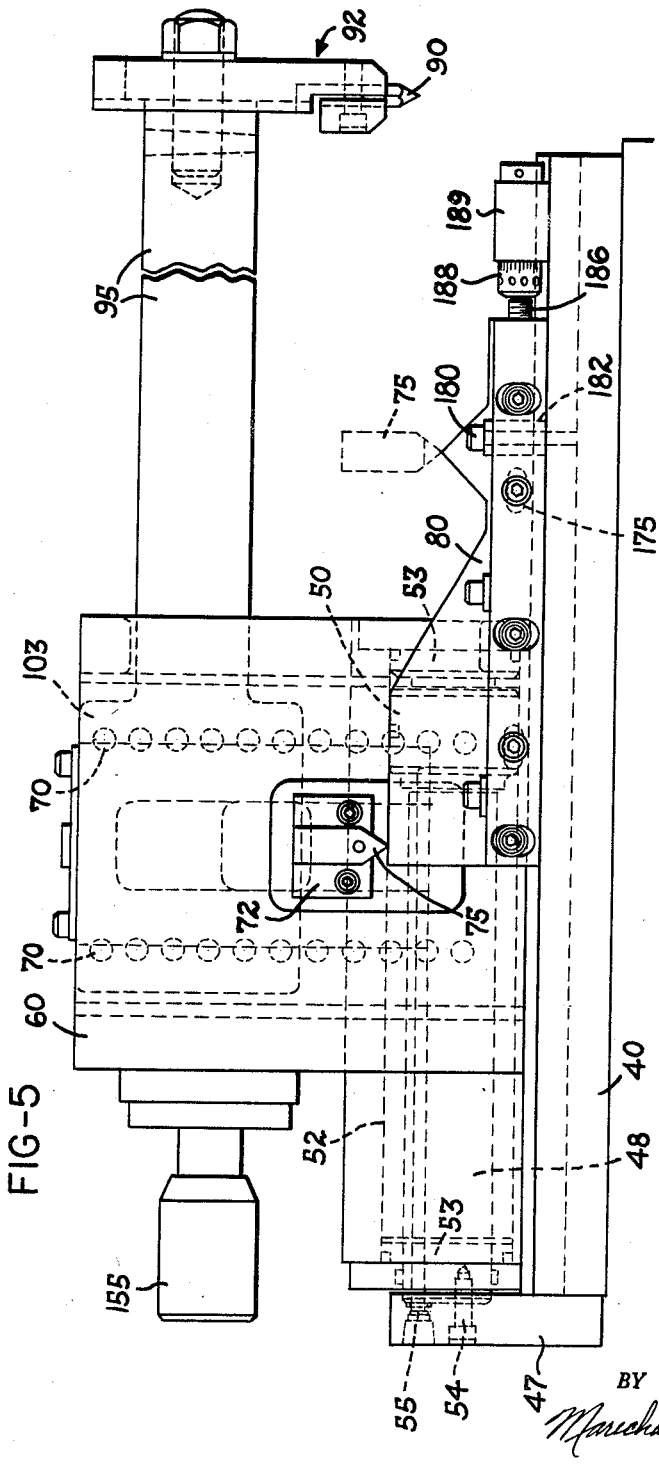

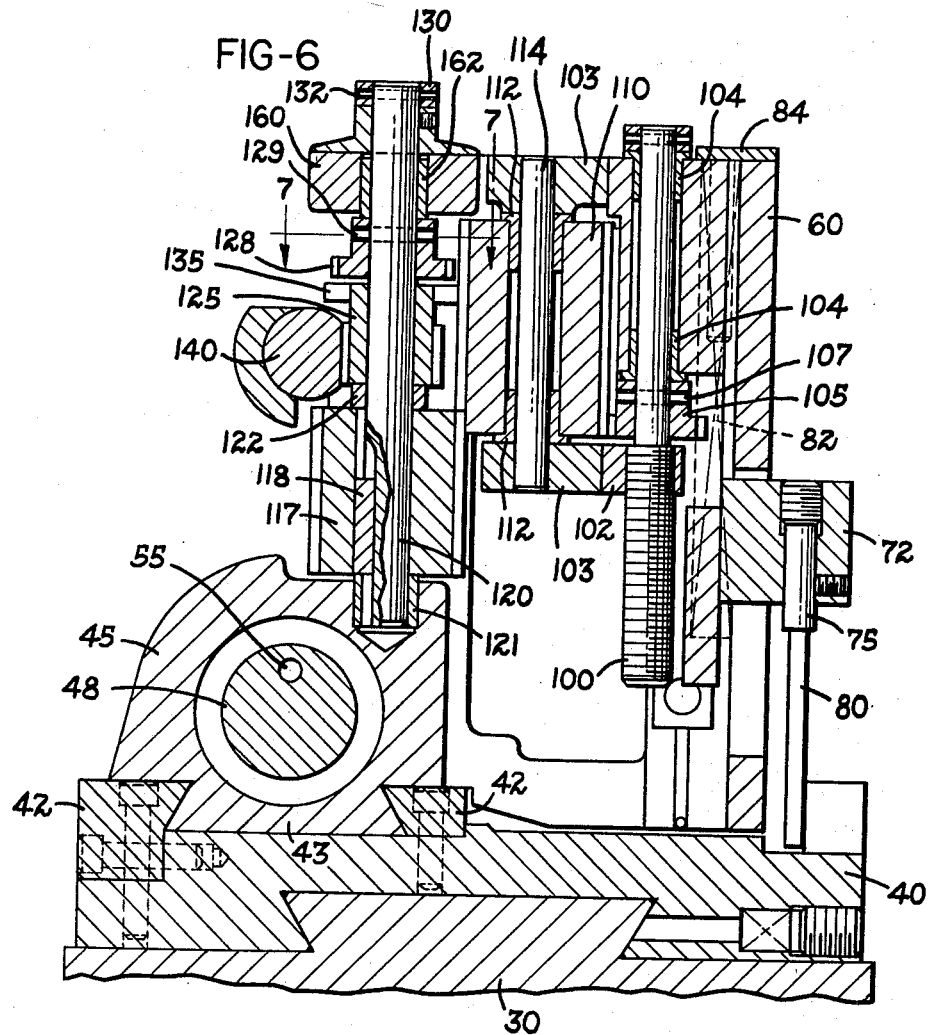
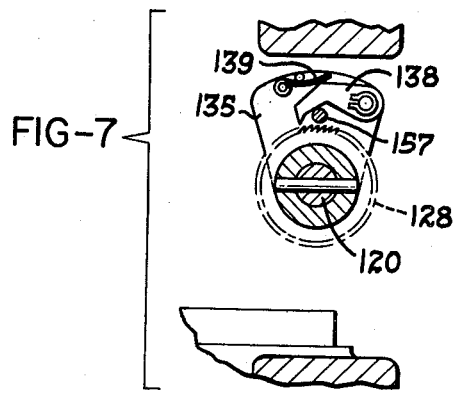

3,162,186
FORM DRESSER FOR GRINDERS
Richard C. Montanus, Springfield, Ohio, assignor to The Springfield Machine Tool Company, Springfield, Ohio, a corporation of Ohio
Filed June 5, 1961, Ser. No. 114,744
5 Claims. (Cl. 125—11)

This invention relates to a novel form dresser construction for the grinding wheels of machine tools.

In machine tool grinders, particularly form grinders, it is often necessary to maintain a predetermined configuration of the grinding wheel, such that the parts operated on the wheel will consistently be ground to the same desired configuration despite wear or deterioration of the wheel during grinding. Thus, the grinding wheel is dressed regularly to maintain its desired configuration, and this of course results in a reduction in diameter of the wheel as the dressing tool recuts or dresses the wheel to the desired peripheral configuration. In many instances, such peripheral configuration will include sharp edges, or peripheral surfaces intersecting at relatively acute angles, and therefore it is desirable to have a dressing tool which can form these surfaces, as by following a template, with extreme accuracy.

For example, machine tool grinders are often employed to form finished surfaces on parts to extremely close tolerances, and the degree of tolerance which can be attained is of course directly related to the maintenance of an accurately formed surface configuration on the grinding wheel. One way of maintaining the dressed configuration of the grinding wheel is to cause a stylus to trace over a template having the desired wheel configuration, and to transfer the resultant motion of the stylus to the dressing tool, causing such tool to traverse the grinding wheel and form the desired surface configuration thereon. There are inherent causes of inaccuracy in such a system, particularly in the ability of the stylus to trace precisely over the template surface, and in the ability of the mechanism to transfer the motion of the stylus without deviation to the dressing tool.

Each time the grinding wheel is dressed, the dressing tool inherently reduces the diameter of the wheel to some extent. The amount of such reduction due to dressing will vary according to the particular configuration of the grinding wheel and also, at least to some extent, according to the desired wheel configuration. As an example, if the wheel surface incorporates deep and relatively sharp valleys or cut-outs, the tendency to wear along the parts of the wheel of greater dimension, or at sharp edges where different surfaces intersect, will determine the amount of material which must be removed by the dressing tool to maintain its desired surface configuration.

Accordingly, the primary object of this invention is to provide a novel form dresser for machine tool grinders in which the dressing tool is accurately controlled from a template.

Another object of this invention is to provide a compact adjustable and essentially portable form dresser construction which may be mounted in any of a plurality of positions with respect to the arbor of a grinding wheel, thus increasing the versatility of the entire grinding machine, but avoiding limitations in the movement of the grinding wheel, and its related parts, due to obstructions formed by the dresser.

Another object of this invention is to provide a novel form dresser for grinding machines wherein the wear compensation for the wheel dressing operation is accomplished entirely apart from the compensation between the wheel and the work required to maintain the wheel precisely in contact with the work as the size of the wheel decreases in use.

Another object of this invention is to provide such a novel dresser construction wherein a new grinding wheel can be mounted on its arbor and dressed to the desired configuration before the wheel is moved into active contact with the work, thus avoiding disruption of the set up of stops or the like which determine the dimensional relationship between the work and the grinding wheel.

An additional object of this invention is to provide a novel form dresser for grinding wheels in which compensation for deterioration of the wheel due to dressing can be accomplished automatically, or under control of an operator, and in which the amount of dressing compensation can be adjusted and closely controlled such as to obtain the longest possible useful life from the grinding wheel.

Another object of the invention is to provide such a compensating construction for form dressers which inherently includes a reset locator or index by means of which the compensating mechanism can be returned to a predetermined position when a new grinding wheel is mounted.

Another object of this invention is to provide a novel form dresser construction in which the path of the template following stylus and the dressing tool will be the same, and thus close control can be obtained over the configuration of the intersection of different surfaces formed on the dressed grinding wheel.

Other objects and advantages of the invention will be apparent from the following description, the accompanying drawings and the appended claims.

In the drawings—

FIG. 1 is a perspective view of the front of one type of grinding machine with which the present invention is concerned, incorporating the novel form dresser construction provided by this invention.

FIG. 2 is a plan view, with some parts broken and foreshortened, of the dresser construction;

FIGS. 3 and 4 are enlarged detail section views, taken on lines 3—3 and 4—4 of FIG. 1, respectively, showing the adjustments in the mounting of the template;

FIG. 5 is a front elevational view of the form dresser;

FIG. 6 is a sectional view on an enlarged scale, taken through the center of the dresser, on the line 6—6 of FIG. 2; and FIG. 7 is a somewhat diagrammatic view, taken generally along line 7—7 of FIG. 6, and illustrating a portion of the drive in the compensating mechanism.

Referring to the drawings, FIG. 1 shows the overall construction of a typical machine tool grinder to which the invention is applied. The machine includes a worktable in the form of a face plate 10 mounted in base 12, and preferably rotatable therein if necessary. At the rear of the base there is a vertically extending column 15 which provides vertical ways for a large cross-slide 17, the position of this slide being controlled by cables 18 through suitable motors (not shown). Mounted on the slide 17 are a plurality of smaller horizontally travelling slides 20. The same reference numeral is applied to each, since they are essentially of the same construction. In each of these slides is a rotatable mounting head 22, and each of these carries the mounting arm 24 for the grinders. The particular grinder construction disclosed herein includes a motor 25 which includes an arbor 26 extending directly therefrom as part of its shaft, and providing suitable mountings at 27 for the grinding wheel.

Each motor 25 has dove-tail slides 30 formed on the top and opposite sides thereof, forming three different possible mountings for the form dresser construction provided by the invention. A portion of one of such dovetails is shown on an enlarged scale in FIG. 6.

The remaining parts of the machine tool grinder shown in FIG. 1, including control panels and other depending controls, form no part of the present invention and are illustrated merely to show a typical machine tool grinder with which the present invention is concerned. It should be understood, however, that the invention is in no way limited to use with this particular grinder construction.

The form dresser construction provided by this invention includes a base 40 adapted for mounting on any one of the three dove-tail supports 30 of the grinding motor. Carried on this base, preferably bolted thereto as shown in FIG. 6, are a pair of gibs 42 which cooperate to form a slide mounting engaged with the dove-tail member 43 formed on a traverse slide 45. At one end of base 40 there is a fixed bracket member 47, and secured to this bracket is the piston rod 48 (FIG. 5) of a traverse motor. This motor includes the piston 50, which is thus mounted stationary with respect to base 40, and the cylinder 52 formed in the body of traverse slide 45, and closed at opposite ends by suitable seals 53 to form a double-acting reciprocating traverse motor. The preferred type of motor is a hydraulic motor, and hydraulic fluid under pressure for activation thereof is supplied alternately through the passages 54 and 55, the passage 55 extending as shown in FIG. 5 through the piston rod 48 and into the piston 50 to supply fluid under pressure beyond the end of the piston, as when causing the motor to produce a movement of the traverse slide to the right as viewed in FIGS. 2 and 5.

The traverse slide 45 includes a pedestal member 60 at its forward end which projects upwardly from base 40, being slightly spaced therefrom as shown in FIG. 6 to avoid any contact with the base which would produce undesired friction and impede the smooth movement of the traverse slide in its ways on the base. Mounted in this pedestal portion is a cross-slide 65 which is provided with anti-friction slide mountings to minimize any resistance to movement of the cross-slide. These mountings include elongated races 66 (FIG. 2) formed on opposite sides of the cross-slide, and complementary race members 68 which are bolted to the pedestal part 60. A plurality of ball bearings 70 are positioned between the races to form the necessary anti-friction mounting.

It should be noted, also, that this type of mounting construction can be adjusted for zero back-lash, so that the movement of cross-slide 65 is precisely linear with respect to pedestal member 60, and can be adjusted to be exactly normal to the motion of traverse slide 45. At the forward end of cross-slide 65 there is a mounting bracket 72 which provides a mounting for a follower stylus 75. This stylus contacts a form template 80 mounted on base 40 alongside the traverse slide 45. Details of the mounting of the template are discussed in detail below.

The stylus 75 is urged into contact with the template by a plurality of springs 82 which are shown diagrammatically in FIG. 2, and the positions of which are shown in dotted lines in FIG. 2. These springs are received in suitable bore holes through the pedestal 60 and engage a portion of cross-slide 65, being held under compression by the cap 84 which is fixed to the pedestal 60 and extends over the upper end of the springs. In this manner, stylus 75 is continuously maintained in contact with the guiding surface of template 80 throughout the motion of traverse slide 45.

The dressing tool 90 is carried in a suitable chuck or mounting bracket 92 which in turn is bolted to the end of a rigid elongated arm 95. This arm extends beyond the end of base 40, particularly as shown in FIG. 1, and the arm in turn is provided with a pair of gibs 97 bolted thereto and forming a slide engaging with a dove-tail member 98 on the cross-slide 65, particularly as shown in FIG. 2. Arm 95 is, therefore, adjustable on the cross-slide with reference to the stylus 75, and, although the stylus and the dressing tool 90 are caused to transcribe the same path, the path of the dressing tool (and its arm 95) can be displaced toward and away from the axis of the grinding wheel (mounted on arbor 26), in accordance with changes in diameter of the grinding wheel.

The control of such compensating adjustment of the dressing tool with respect to the stylus is accomplished through means of a lead screw 100 engaged with a follower nut 102 fastened to the base 103 of arm 95. It will be understood that this base is in effect an integral part of the arm and moves therewith. As shown, the base also provides the mounting and support for the gibs 97. The lead screw 100 is journalled in pedestal 60 within a pair of bearings 104, and immediately above the active threaded portion of the lead screw there is a drive gear 105 fastened to the lead screw shaft by means of a cross-pin 107. This gear is in mesh with an elongated transfer gear 110, and the transfer gear is carried in bushings 112 which are mounted upon a stationary pin or shaft 114 press fit into the arm base portion 103.

It will be obvious, therefore, that the arm 95 and its base portion 103 can move vertically (as viewed in FIG. 6) with respect to the cross-slide 65 and that during such movement gear 110 remains in mesh with the lead screw drive gear 105. The gear 110 is in turn meshing with an elongated gear 117, and this gear is driven through key 118 from a counter shaft 120. The shaft is supported at its lower end in a sleeve bearing 121 pressed in the traverse slide 45, and stacked on the counter shaft above gear 110 and 117, respectively, are a spacer 122, a pinion 125, and a ratchet wheel 128 which is secured to shaft 120 by a cross-pin 129. At the top of the shaft is a retainer cap or ring 130 fastened to the shaft by a rod pin 132.

The pinion 125 is formed as an integral part of a drive arm 135 (FIG. 7) and on this arm is a pivotally mounted drive pawl 138 which is biased by a small leaf spring 139 toward contact with the teeth on ratchet wheel 128. The pinion is in turn in mesh with a drive rack 140, and this rack is carried on the end of the piston rod of the compensating motor 145 (FIG. 2). This motor includes a cylinder 146 and a double-acting differential area piston 148, both mounted on the traverse slide. The stroke of the piston within the cylinder is controlled by an adjustable head member 150 which is carried on a threaded spindle 152, and this spindle may be advanced to form an adjustable stop for the compensating motor shaft by manipulating the adjusting handle 155.

A dowel or pin 157 depends from the portion 160 of the slide body 145 which carries the support bushing 162 for shaft 120. When the compensating mechanism is at rest, or at its returned position under control of the rack 140, pin 157 engages pawl 138 and holds it away from the ratchet wheel, against spring 139.

The operation of the compensating drive is as follows. Assuming that pawl 138 is in its rest position, disengaged from the ratchet wheel 128, when the compensating motor is pulsed, to move it to the left as shown in FIG. 2, the carrier or drive arm 135 is pivoted counter-clockwise, as viewed in FIGS. 2 and 7. The pawl 138 drops over pin 157 and drives the ratchet wheel 128 counter-clockwise through a predetermined stroke which depends upon the position of the stop head 150, and this head of course is pre-adjusted by the operator to the desired position. The return stroke of the compensating motor returns arm 135 to the rest position, and again releases pawl 138.

The rack 140 thus drives the shaft 120 only in a counter-clockwise direction, but this shaft in turn drives gear 117 through the transfer gear 110 and the drive gear 105 rotates the lead screw 100 to change the relative position of the arm upon the cross-slide. The lengths of gears 117 and 110 are such that these gears are always in mesh throughout the maximum movement of which the arm is capable, and this includes movement of the cross-slide as the stylus traces over the template 80.

It is possible, therefore, to pulse the compensating motor 145 manually, as through a controlled pneumatic or hydraulic system of conventional design, and it is also possible to pulse this motor automatically through such a system, as by a counter. For example, a conventional counter can be arranged to count the operations of the dressing mechanism, and to cause the compensating mechanism to advance the dressing tool 90 after a predetermined movement of wheel dressing operations. At the same time, if the operator decides that further compensating movement is necessary he can accomplish this by hand, as by rotating the knob 130 which in turn rotates shaft 120 and gear 117 directly, or he can accomplish it through the predetermined stroke by pulsing the compensating motor. The knob 130, with its index markings and direct connection to shaft 120, also provides a convenient index for establishing the return of the compensating mechanism to a zero position, as when aligning the dresser for use with a new grinding wheel.

The template 80 has an accurately adjustable mounting which provides for close correlation of the template form, which determines the configuration to which the grinding wheel is dressed, with the outside dimensions of the wheel as it is mounted on the arbor. Thus, referring to FIGS. 2–5, a template mounting bar 170 is provided with clamping bolts 172 adapted to thread into suitable threaded sockets 173 formed at spaced intervals in the template 80. The clamping bolts extend through washers 174 and horizontally elongated slots 175 in the bar 170, and thus these bolts can move within limits longitudinally of the bar. The bar in turn is fastened to the base 40 by a plurality of vertically extending clamping bolts 180 (FIG. 2) and these extend through elongated vertical openings or slots 182 in bar 170.

At one end of the bar there is a threaded socket 185 receiving an adjustment screw 186, and this screw is rotated by a manually operated micrometer adjustment knob 188 mounted in a fixed bracket 189 on the base. Thus, with the bolts 180 loose, the micrometer adjustment can be actuated to determine precisely the position of the template along the base, i.e. from right to left as viewed in FIGS. 2 and 5, but the slots 182 determine the exact transverse positioning of the template such that it falls beneath the path traversed by the stylus 75.

Vertical adjustment of the template is provided by the eccentric bushings 190 which are fixed to the ends of adjustment bolts 192 mounted in the bar 170. The heads of the clamping bolts 172 can move vertically within slots 193, and thus when the clamping bolts are loosened the eccentric adjustment bolts 192 can be rotated to raise or lower template 80 with respect to the bar 170, and when the final position is determined, the clamping bolts 172 are then tightened to maintain the template in the desired position.

Accordingly, the present invention provides for precise tracing of the stylus 75 over the form template, and by reason of the anti-friction high precision mounting of the dressing tool and its supporting arm, accurate control of the path of movement of the dressing tool is obtained. The apparatus, therefore, is capable of dressing the grinding wheel to precise configuration, and close adjustment of the dressing operation can be obtained. Furthermore, the entire unit, as shown in the drawings, is a self-contained apparatus which can be mounted in a plurality of positions about the grinding wheel arbor, for example on the motor where a direct drive grinder is used as illustrated in FIG. 1. Other features of the invention will be apparent to those skilled in the art from the foregoing description.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A portable form dresser adapted to be mounted in any of a plurality of positions parallel to the arbor of a grinding wheel for dressing the surface of said wheel to a desired peripheral configuration, said dresser comprising a base adapted for mounting in precise parallel relation to the rotational axis of the wheel, a traverse slide mounted for movement on said base along the axis of said wheel, a traverse motor connected to reciprocate said traverse slide through a predetermined movement, a cross-slide on said traverse slide mounted for movement thereon normal to the movement of said traverse slide, a follower stylus carried on said cross-slide and centered with respect thereto, a template mounted in a fixed position on said base adjacent said traverse slide and extending along the direction of movement thereof, means urging said stylus into contact with said template to follow the configuration thereof during traversing motion of said traverse slide and thus to cause movement of said cross-slide, a single dressing tool mounted on said cross-slide to contact the grinding wheel and operable to transcribe a continuous path across the surface of the wheel according to the configuration of said template for dressing the peripheral surface of the wheel to the configuration determined by said template, and compensating means acting on said dressing tool to alter the position thereof on said cross-slide in a direction parallel to the movement of said cross-slide providing compensation for the reduction in diameter of the grinding wheel.

2. A portable form dresser adapted to be mounted parallel to the arbor of a motor driven grinding wheel for dressing the surface of said wheel to a desired peripheral configuration, said dresser comprising a base adapted for mounting along side the driving motor in precise parallel relation to the rotational axis of the wheel, a traverse slide mounted for movement on said base along the axis of said wheel, a traverse motor connected to reciprocate said traverse slide through a predetermined movement at least as great as the thickness of the grinding wheel, a cross-slide on said traverse slide mounted for movement thereon normal to the movement of said traverse slide, a follower stylus carried in a centered position on said cross-slide, a template mounted in a fixed position on said base adjacent said traverse slide and extending along the direction of movement thereof, springs acting on said cross-slide urging said stylus into contact with said template to follow the configuration thereof continuously during traversing motion of said traverse slide, a single dressing tool mounted on said cross-slide to contact the grinding wheel and scribe a continuous path across the surface of the wheel according to the configuration of said template, and compensating means acting on said dressing tool to alter the position thereof on said cross-slide in a direction parallel to the movement of said cross-slide providing compensation for the reduction in diameter of the grinding wheel.

3. A form dresser for a motor operated grinder having a motor and an arbor driven thereby arranged to rotate a grinding wheel, said dresser comprising a base adapted for mounting along side said motor in precise relation to the rotational axis of the wheel, a traverse slide carried on said base and movable along said wheel axis, means connected to reciprocate said traverse slide along the arbor toward and away from the wheel, a cross-slide on said traverse slide, anti-friction mountings for said cross-slide providing for precise movement of said cross-slide normal to the movement of said traverse slide, a follower stylus extending from said cross-slide in a centered position with respect to said anti-friction mountings, a form template mounted in fixed position on said base alongside said traverse slide and extending along the path of motion of said stylus during reciprocation of said traverse slide, means maintaining said stylus continuously in contact with said template to follow the configuration of said template, an arm extending from said cross-slide outwardly along said arbor, means providing an adjustable mounting for said arm on said cross-slide, a single dressing tool on said arm arranged to contact the grinding wheel to transcribe a continuous path over the surface of the wheel in accordance with the compound motion of said stylus in following the configuration of said template during movement of said traverse slide, and a compensating motor acting on said adjustable mounting of said arm to advance said arm toward said arbor independently of said cross-slide providing compensation for the reduction in diameter of the wheel.

4. A form dresser for a motor operated grinder having a motor and an arbor driven thereby arranged to rotate a ginding wheel, said dresser comprising a base adapted for mounting in precise relation to the rotational axis of the wheel, a traverse slide carried on said base and movable along said wheel axis, means connected to reciprocate said traverse slide toward and away from the wheel, a cross-slide on said traverse slide, anti-friction mountings providing for precise movement of said cross-slide normal to the movement of said traverse slide, a stylus extending from said cross-slide, a form template mounted in fixed position on said base to extend along the path of motion of said stylus during reciprocation of said traverse slide, means maintaining said stylus continuously in contact with said template to follow the configuration of said template during motion of said traverse slide, an arm extending from said cross-slide outwardly along the arbor, means providing an adjustable mounting for said arm on said cross-slide, a dressing tool on said arm arranged to contact the grinding wheel and dress the surface of the wheel in accordance with the configuration of said template during movement of said traverse slide, and means for adjusting the position of said template to correlate the configuration thereon and the resultant movement of said dressing tool to the dimensions of the grinding wheel.

5. A form dresser for a grinder having an arbor arranged to rotate a grinding wheel, said dresser comprising a base adapted for mounting in precise relation to the rotational axis of the wheel, a traverse slide movable on said base parallel to said wheel axis, power operated means connected to drive said traverse slide toward and away from the wheel, a cross-slide on said traverse slide, anti-friction mountings for said cross-slide providing for precise movement thereof normal to the movement of said traverse slide, a stylus extending from said cross-slide, a template mounted in fixed position on said base alongside said traverse slide and extending along the path of motion of said stylus with said traverse slide, means maintaining said stylus continuously in contact with said template to follow the configuration of said template, an arm extending from said cross-slide outwardly along said arbor, means providing an adjustable mounting for said arm on said cross-slide, a single dressing tool on said arm arranged to reflect the motion of said stylus while in contact with the grinding wheel to transcribe a continuous path over the surface of the wheel in accordance with the configuration of said template, and a compensating mechanism acting on said adjustable mounting of said arm for adjusting said arm relative to said arbor independently of said cross-slide, said mechanism including an adjustable stroke compensating motor and a drive connection continuously engaged with said arm mounting during motion of said cross-slide induced by said stylus in following said template.

References Cited in the file of this patent
UNITED STATES PATENTS

| | | |
|---|---|---|
| 2,447,503 | Harper et al. | Aug. 24, 1948 |
| 2,565,687 | Hoier | Aug. 28, 1951 |
| 2,697,426 | Price et al. | Dec. 21, 1954 |
| 2,775,235 | Jessup | Dec. 25, 1956 |
| 2,900,974 | Hill | Aug. 25, 1959 |